Dec. 31, 1935.   F. M. PYZEL ET AL   2,026,250
MANUFACTURE OF AMMONIUM SULPHATE
Filed July 17, 1934   2 Sheets-Sheet 2
Fig. II
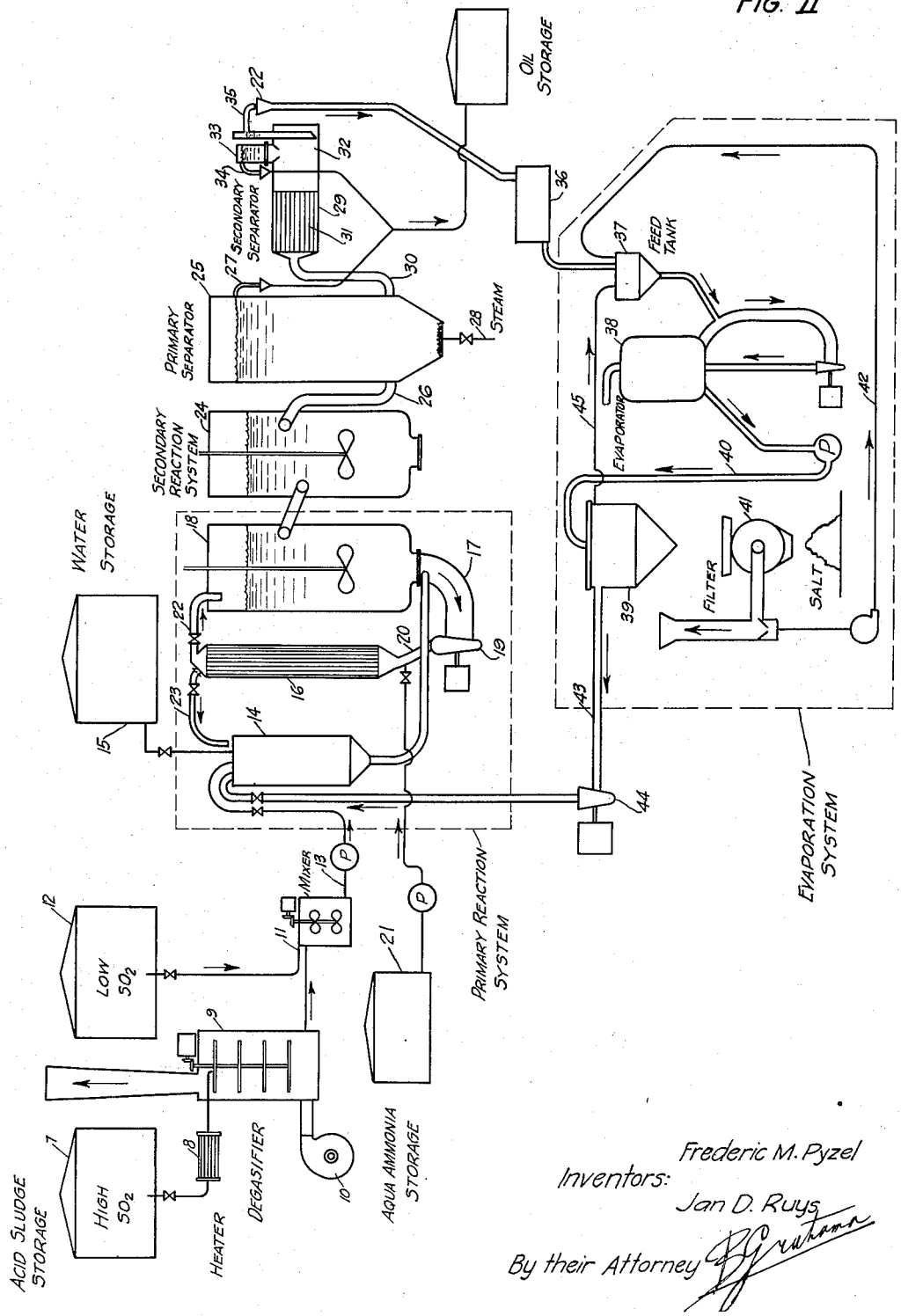
Inventors: Frederic M. Pyzel
Jan D. Ruys
By their Attorney Patented Dec. 31, 1935

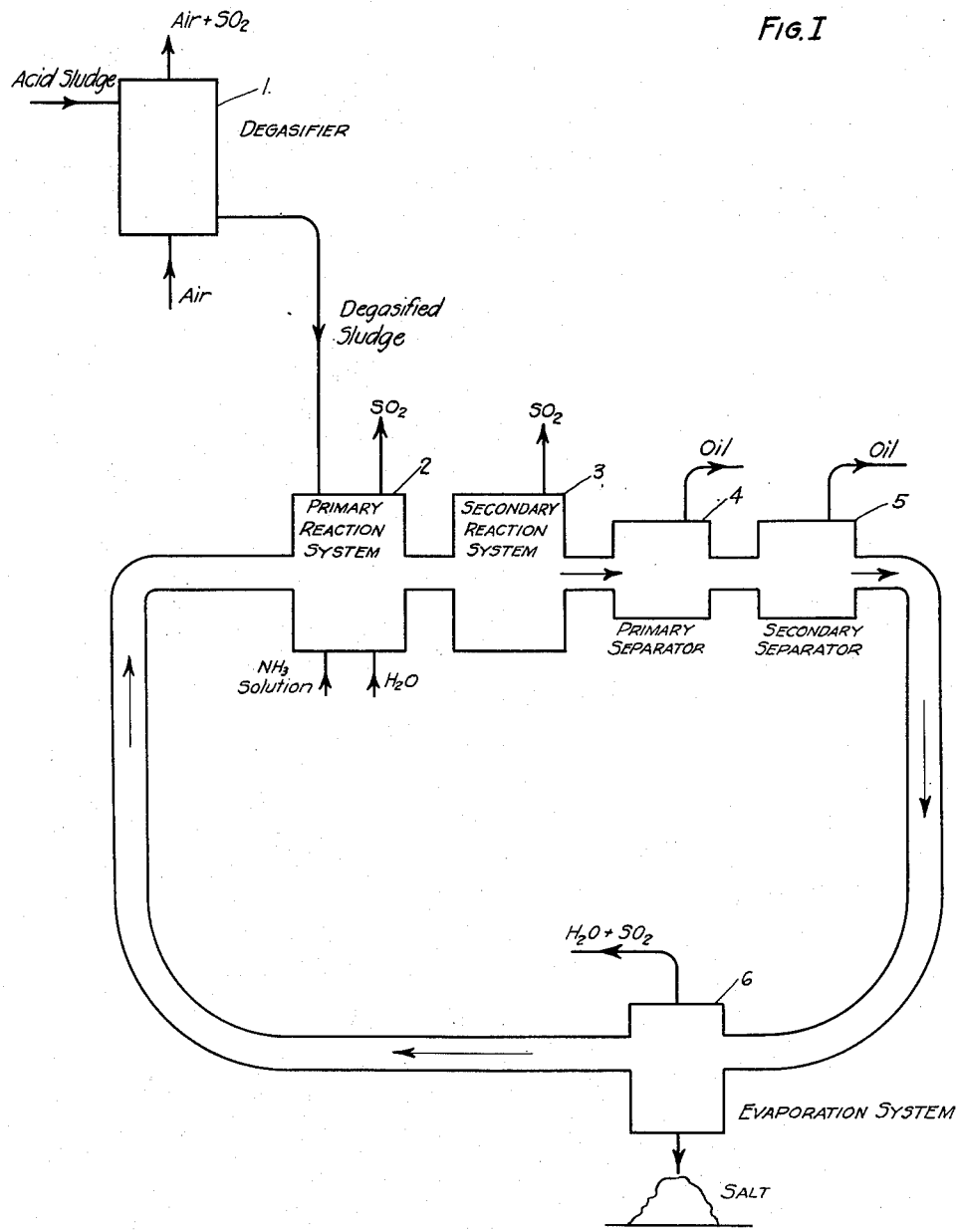

2,026,250

UNITED STATES PATENT OFFICE 2,026,250

MANUFACTURE OF AMMONIUM SULPHATE

Frederic M. Pyzel, Piedmont, and Jan D. Ruys, Pittsburg, Calif., assignors to Shell Development Company, San Francisco, Calif., a corporation of Delaware Application July 17, 1934, Serial No. 735,620

5 Claims. (Cl. 23—119)

This invention is concerned with the manufacture of ammonium sulphate, in which acid sludge is used to supply the sulphate radical. By the term "acid sludge", we mean the dark colored liquid produced by the action of sulphuric acid upon hydrocarbons. This is to be differentiated from "sludge acid", meaning the acid recovered from an acid sludge by diluting, heating and settling, whereby substantial amounts of tarry hydrocarbon material can be skimmed or otherwise removed.

An object of this invention is to provide improvements in a process whereby ammonium sulphate or marketable grade may be manufactured from various acid sludges. A further object of this invention is to provide apparatus sulphate of marketable grade may be manufactured from various acid sludges. A further object of this invention is to provide apparatus monium sulphate of marketable grade. The further objects of this invention will be apparent from this specification.

In application, Serial No. 628,969, is described a process and apparatus suitable for obtaining ammonium sulphate, using certain acid sludges. In application, Serial No. 677,425, is described a process by which certain sulphur dioxide-containing sludges can be used to obtain ammonium sulphate.

In this application are set forth, more specifically, features of and in connection with apparatus and process for carrying out the manufacture of ammonium sulphate from acid sludges on a commercial scale. It may be here stated that the process is very sensitive in its nature and for successful operation it is necessary that frequent checks on acidity, temperature, salt concentration, and rates of flow of the different streams be made. The general nature of the process will be more readily comprehended by referring to the accompanying drawings of which:

Figure I is a diagrammatic flow-sheet of the process, and

Figure II is a flow diagram, partly in section, of apparatus suitable for carrying out the process on a commercial scale.

The process generally involves the following steps. Removing excess amounts of sulphur dioxide from acid sludge; neutralizing the acid content of the acid sludge in a reaction zone while maintaining the temperature, acidity and ammonium sulphate concentration within desired limits in said zone: removing oily material from the aqueous solution formed, partly evaporating the aqueous solution in order to form salt, and returning part of the aqueous solution to the reaction zone above-mentioned.

Referring to Figure I, acid sludge as received from the refinery is passed through a degasifier (1) in which it is stripped of excess amounts of sulphur dioxide present in it, care being taken that further decomposition of the acid sludge is avoided by proper combination of time and temperature of treatment. The degasified sludge then enters a primary reaction system (2) into which is also fed controlled amounts of aqua ammonia and of water as well as return solution as mentioned further on in this specification in order to combine the acid introduced as sludge and to maintain the concentrations at the desired figure. From this reaction system (2) the reacting liquid mixture is passed to a secondary reaction system (3) where substantial completion of the reaction between the various constituents of the mixture takes places. The secondary reaction system (3) further serves to even out fluctuations in acidity, ammonium sulphate concentration, etc., by its "buffer" action on the liquid flowing through. Thereafter the resulting mixed oil and aqueous liquids are carried to a primary separator (4) maintained in a quiescent condition. Here the bulk of the oily liquid rises to the upper part of the separator (4) from which it is removed, while any solids present settle to the bottom of the separator from which they can be removed by draining, or be dissolved by means of injected steam or water.

The aqueous liquid, which consists substantially of ammonium sulphate solution, is passed to a second separator (5) wherein further amounts of oily material separate out of the aqueous liquid. The aqueous liquid then passes to an evaporation system (6) wherein water vapor and some sulphur dioxide are removed resulting in the formation of crystals of ammonium sulphate, which are removed and eventually dried and bagged. Part of the aqueous liquid is withdrawn from the evaporation system (6) and returned to the primary reaction system (2).

It will thus be seen that this is a cyclic process, in which amounts of acid sludge and aqua ammonia are continuously introduced and at different points recovered oil and ammonium sulphate are continuously removed.

A flow diagram of apparatus suitable for carrying out the process is shown in Figure II. Referring to this figure an acid sludge containing sulphur dioxide is withdrawn from the storage tank (7) and after passing through a heater (8) in which it is raised to a desired temperature suitable for degasification is passed into the degasifier (9) where it flows countercurrent to a stream of air introduced from a blower (10). Most of the sulphur dioxide passes off with the air through a suitable stack. The degasified sludge collects in the bottom of the degasifier and is pumped to a mixer (11) in which it may be blended with acid sludge of low sulphur dioxide content withdrawn from storage tank (12).

It should be understood that we can also operate entirely on sludge of high sulphur dioxide content or entirely on sludge of low sulphur dioxide content.

The sludge when of the desired low sulphur dioxide content passes through line (13) to a receiver (14). In this receiver flows also the return solution from the evaporation system, the process water from tank (15) and a part of the solution from the cooler (16), as will be hereinafter more fully explained.

The receiver (14) is fitted with an impeller or other suitable agitating means for thoroughly dispersing the oily materials throughout the solution. From the bottom of the receiver (14) oil-solution-acid mixture is continuously passed into the leg (17) of the reactor vessel (18).

The oil-solution-acid mixture is mixed with the liquid in the leg (17) and flows through a centrifugal pump (19) in which further mixing takes place and up through a short pipe (20) into the cooler (16). Into the pipe (20) controlled amounts of aqua ammonia are continually injected from the tank (21) in order to neutralize the acid in the oil-solution-acid mixture flowing through it. Considerable heat is generated by the reaction between the acid in the mixture and the aqua ammonia. To help keep the temperature within the desired limits the reacting liquid stream is carried through the cooler (16) abovementioned, where it passes in heat exchange with a suitable cooling medium, for example, water. From the top of the cooler (16) the main part of the stream flows back into the top of the reaction vessel by pipe (22), while a small part flows into the receiver (14) by way of pipe (23) to assist in breaking down the acid sludge. The contents of the reactor vessel are kept thoroughly mixed by means of an agitator. The receiver (14), cooler (16), and reactor vessel (18) with their inter-connecting pipes constitute the primary reaction system as indicated in the drawings. From near the top of the reactor vessel (18) a stream of liquid continually passes over to the secondary reaction system, which consists of the reactor (24). This reactor (24) as stated previously serves a two-fold purpose. Its main purpose is to even out variations in the ammonium sulphate concentration, the acidity, and the temperature of the mixture leaving the first reaction system. Its secondary purpose is to provide further reaction time under the more uniform reaction conditions existing in this reactor.

From the reactor (24) amounts of liquid are continually passed to a primary separator (25) through pipe (26). In this unit, maintained in a quiescent condition, the majority of the oily material in the liquid, owing to its lower specific gravity, rises to the top of the separator from where it is carried out of the system through the over-flow pipe (27), while any crystals or dirt carried in the entering stream will settle into the conical bottom of the separator. As this sediment consists primarily of ammonium sulphate crystals, it is advantageous to inject steam into the bottom of the separator (25) by means of a steam line (28) which serves to dissolve the settled crystals.

The remaining aqueous liquid which contains small amounts of oily material, is passed to the secondary separator (29) through conduit (30). In the separator (29) further amounts of oil are separated from the aqueous liquid. This secondary separator (29) is for the purpose of removing the finer globules of oily material which are more difficultly separable. The separator may consist of a centrifuge or other suitable separating means but its preferred form consists mainly of a chamber containing a tube bundle (31), through which tubes the aqueous liquid is passed. In passing through the tubes an agglomeration of oily material forms into globules of such size that upon reaching the chamber (32) at the end of the tube bundle the globules can rise into the dome (33) from which the oil is removed by over-flow pipe (34). This recovered oil, together with the oil from overflow (27) is led by means of piping (44) to an oil storage tank (45). The aqueous liquid, now almost entirely consisting of ammonium sulphate solution is withdrawn from the lower portion of the secondary separator through an over-flow pipe (35) and flows into a surge tank (36). The surge tank (36) serves to remove momentary inequalities in the rate of production of the reaction and evaporation systems. Solution from the surge tank (36) is passed by way of a feed tank (37) into a vacuum evaporator (38). Amounts of solution with crystals in suspension are continuously removed from the evaporator (38) to a settling tank (39) by means of a pipe (40). The crystals in the solution gravitate to the bottom of the settling tank from which they are withdrawn to a filter (41), where substantially all the solution is removed from the salt. The salt then may be finally dried and bagged. The solution removed from the crystals is conducted to the feed tank (37) above described by conduit (42). Some of the solution from the upper part of the settling tank (39) is continually returned to the receiver (14) of the reaction system by conduit (43) and pump (44). The tank (39) is provided with an overflow (45) which leads to the feed tank (37).

In operating according to the system above described, constant care must be exercised in order to obtain satisfactory operation. The temperature in the reactor and other vessels must be carefully maintained, and the sulphuric acid and the ammonium sulphate concentrations within the reactor vessel must be kept within desired limits. Further the amount of solution recycled in the system must also be maintained within a certain percentage range for successful operation. As an example of operating conditions we have found that it is preferable to keep the temperature in the reactor below 95° C., the free sulphuric acid content in the reactor between 0% and 1% at the same time maintaining the mixture approximately saturated with ammonium sulphate.

The acid sludge contains sulphuric acid, water, sulphur dioxide, sulphonic acids, nitrogen bases, hydrocarbon material, alcohols, esters, alkyl sulphates, hydrogen sulphide and other complex compounds. If the acidity is kept too high in the reactor sulphates of nitrogen bases will be formed, making the production of clean ammonium sulphate impossible. By maintaining the acidity close to neutral this is avoided. If the acidity is maintained on the alkaline side of neutral, a loss of ammonia results, and, further, the solubility of ammonium sulphate is considerably reduced with slight variations on the alkaline side, making it impossible to maintain a desired ammonium sulphate concentration necessary for the balance of the system. Running alkaline also results in the formation of undesirable compounds.

The return solution serves to continuously purge the evaporator, thus preventing the accumulation of organic material which is forced out of the solution during its reduction in volume due to the evaporation procedure. This solution is returned to the reaction system where the simultaneous separation of large quantities of oil particles appears to assist in removing the fine suspension of oily particles in the return solution.

We have further found that this return solution has a reciprocal effect on the separation of oily material in the reactor system.

We have also found that the plant must be operated for some time after starting up to allow the necessary beneficial effect of the return solution to be felt. During this starting up period the quality of salt will improve gradually. The time required to come into normal operation varies considerably with the nature of the acid sludge, demonstrating that substances are gradually concentrated in the solution circulating through the reaction and evaporation systems, which promote the production of clean salt.

We claim as our invention:

1. In a process for the manufacture of ammonium sulphate by neutralization of acid sludge with ammonia, the steps of mixing acid sludge with ammonium sulphate solution, neutralizing said mixture with aqua ammonia in a reaction system, passing the liquid products of reaction into a separator maintained in a quiescent condition, whereby amounts of oily products of reaction separate from the aqueous products of reaction, then passing the aqueous products of reaction through a tube bundle, whereby further amounts of oily products of reaction separate from the aqueous products of reaction.

2. In a process for the manufacture of ammonium sulphate from acid sludge and ammonia, the steps of injecting ammonia and acid sludge into a cyclic system, mixing the reaction materials with ammonium sulphate solution already in the system, circulating the solution through the system, withdrawing part of the solution at each circulation, and evaporating water from the part of the solution withdrawn.

3. In a process for the manufacture of ammonium sulphate from acid sludge and ammonia, the steps of injecting ammonia and acid sludge into a cyclic system, mixing the reaction materials with ammonium sulphate solution already in the system, withdrawing oily and tarry material forced from said solution, circulating the solution through the system, withdrawing part of the solution at each circulation and evaporating water vapor from the part of the solution withdrawn.

4. In a process for the manufacture of ammonium sulphate by the neutralization of acid sludge with ammonia in a cyclic system, the steps of continuously mixing acid sludge with ammonium sulphate solution passing said mixture into a reactor, passing amounts of ammonia into said reactor, cooling the reacting material, passing the partly reacted material to a second reactor wherein reaction is completed, thereafter separating oily material from the ammonium sulphate solution, withdrawing part of the solution from the system, evaporating water from the part of the solution withdrawn and mixing the remainder of said solution with the acid sludge as first mentioned.

5. In a process for the manufacture of ammonium sulphate by the neutralization of acid sludge with ammonia in a cyclic system, the steps of continuously mixing acid sludge with ammonium sulphate solution, neutralizing said mixture with ammonia in a reaction zone in the system, passing the liquid products of reaction into a separator zone wherein amounts of oily products separate from the ammonium sulphate solution, withdrawing part of the solution from the system, evaporating water from the part of the solution withdrawn and mixing the remainder of the solution with the acid sludge as first mentioned.

FREDERIC M. PYZEL.
JAN D. RUYS.